J. SWENEY.
Machine for Bending Tubes.
No. 54,440.
Patented May 1, 1866.
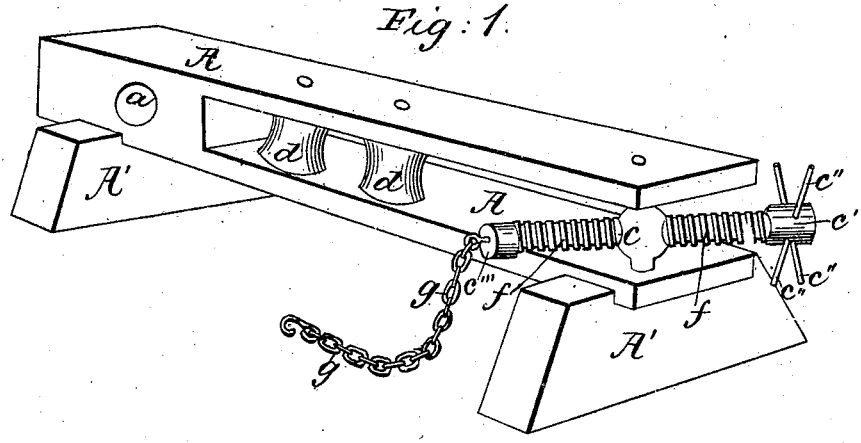
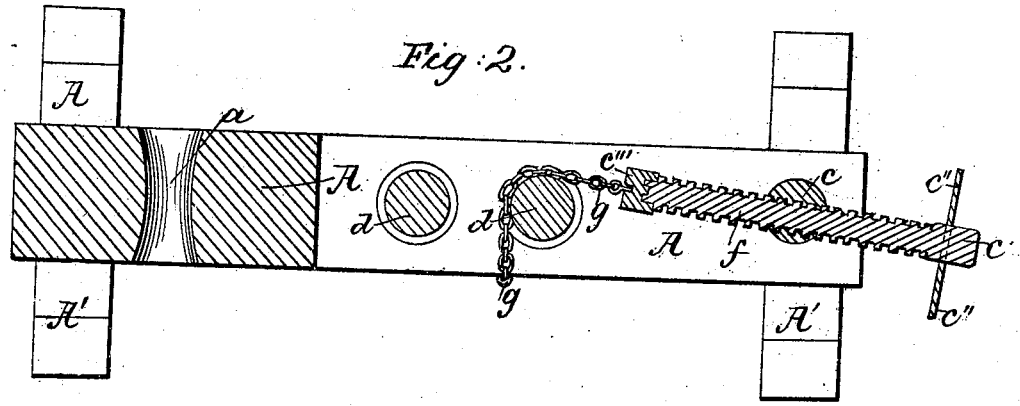
Witnesses
J. W. Randolph
A. Wagner
Inventor
James Sweney

UNITED STATES PATENT OFFICE.

JAMES SWENEY, OF ST. LOUIS, MISSOURI.

IMPROVEMENT IN MACHINES FOR BENDING TUBES.

Specification forming part of Letters Patent No. 54,440, dated May 1, 1866.

*To all whom it may concern:*

Be it known that I, JAMES SWENEY, of the city and county of St. Louis, and State of Missouri, have invented a new and useful Machine for Bending Copper Pipe; and I do hereby declare that the following is a full, clear, and exact description thereof, reference being had to the accompanying drawings, and to the letters of reference marked thereon.

Figure 1 of the annexed drawings is a perspective view of one of the improved machines. Fig. 2 is a horizontal longitudinal section of it.

This invention consists in a frame (of timber or metal) for holding the pipe to be bent, and a screw and chain or equivalent device for attaching the screw to the pipe, so as to pull it around into the proper form.

To enable those skilled in the art to make and use my improved machine, I will proceed to describe its construction and operation.

A is a frame or beam supported on the sills A'. The back end of this beam, for about one-half of its length, (more or less,) is made solid, with the exception of a circular mortise, $a$, which is made transversely through it. This mortise is made smallest in the center of the beam, and then gradually widened toward the outsides of it by an easy curve, as is clearly shown in Fig. 2, so as to prevent the pipe which is placed therein to be bent, as hereinafter described, from coming in contact with any sharp corner and thereby causing a kink or short bend in the pipe. The forward end of the beam A, for about one-half of its length, (more or less,) has a transverse slot in it for the reception of the two sheaves $d\ d$ and nut $c$ of the screw $f$. The nut $c$ has two journals which enter suitable bearings prepared for them in the upper and lower parts of the beam A. Around these two journals the nut may revolve, so as to change the direction of the screw. The screw $f$ passes through the nut $c$, and has a head, $c'$, on one end of it, which is provided with arms or levers $c''$ for turning it, and on the other end of it there is a swivel-head, $c'''$, to which is attached the chain $g$, or its equivalent—a rope of any kind. There may be two or more sheaves, $d\ d$, placed in the slot of the beam behind the nut, as is shown in the drawings, for the purpose hereinafter set forth.

The machine thus constructed, the pipe to be bent is inserted in the mortise $a$, with a sufficient length of it to form the bend or elbow outside of the beam. The chain or rope $g$ is then fastened to the end of the pipe, and the operator turns up the screw by means of the levers $c''$, and by so doing draws the pipe around toward the screw in an easy curve. After the pipe has been drawn around partly enough, with the chain in the direct prolongation of the axis of the screw, as it would be by the above arrangement, it may become necessary to change the direction of the line of traction. This may be done by unfastening the chain and taking it around one of the sheaves $d$, and then again fastening it to the pipe and applying the screw as before. The last-described position is shown in Fig. 2. By these combined arrangements a pipe of any size may be bent into any required form by the expenditure of a very small amount of labor, and the character of the work done will be very much superior to that done by the old process of levers and hammering.

A perforated plate (not shown in the drawings or model) may be fastened upon the back end of the beam to hold pipes, so as to use the machine as a joint drawer.

Having described my invention, what I claim is—

1. The combination of the beam A, having a mortise, $a$, in it, with the screw $f$, when constructed as and for the purpose set forth.

2. The sheaves $d\ d$, in combination with the chain $g$, or its equivalent, and the screw $f$.

JAMES SWENEY.

Witnesses:
 JNO. RANDOLPH,
 A. WAGNER.